United States Patent [19]

Chou

[11] 4,343,610
[45] Aug. 10, 1982

[54] MOTION SYSTEMS PROVIDING THREE OR FOUR DEGREES OF FREEDOM

[75] Inventor: Richard C. Chou, Willingboro, N.J.
[73] Assignee: The Franklin Institute, Philadelphia, Pa.
[21] Appl. No.: 116,956
[22] Filed: Jan. 30, 1980
[51] Int. Cl.³ ............................................. G09B 9/08
[52] U.S. Cl. ................................................. 434/58
[58] Field of Search ............ 35/12 P, 12 W; 272/1 C, 272/31 A; 434/55, 56, 57, 58, 46

[56] References Cited

U.S. PATENT DOCUMENTS

| | | | |
|---|---|---|---|
| Re. 27,051 | 2/1971 | Cappel | 35/12 P |
| 2,358,016 | 9/1944 | Link et al. | 35/12 P |
| 3,295,224 | 1/1967 | Cappel | 35/12 P |
| 3,451,145 | 6/1969 | Holt et al. | 35/12 P |
| 3,451,146 | 6/1969 | Pancoe | 35/12 P |
| 3,577,659 | 5/1971 | Kail | 35/12 P |

*Primary Examiner*—William H. Grieb
*Attorney, Agent, or Firm*—John C. Dorfman

[57] ABSTRACT

A motion system is provided by a platform generally parallel to a base and connected thereto by a column and powered and controlled extensible members, at least three of which are connected between distributed points around the column. In a three degree of freedom device, the column is conical, rigidly supported at its base with a universal joint at its top. The points of attachment define triangles in the base and in the platform surrounding the column with one extensible member connected between each.

In the four degree of freedom version, the column is modified by making it effectively a column which is pivoted or guided at the base or contains an extensible member, preferably retains its triangular shape and its universal joint connection to the platform at its apex. For stability four powered and controlled extensible members are provided between points in the base and platform distributed around the column, a preferred pattern of arrangement being a square with the column at the center.

15 Claims, 4 Drawing Figures

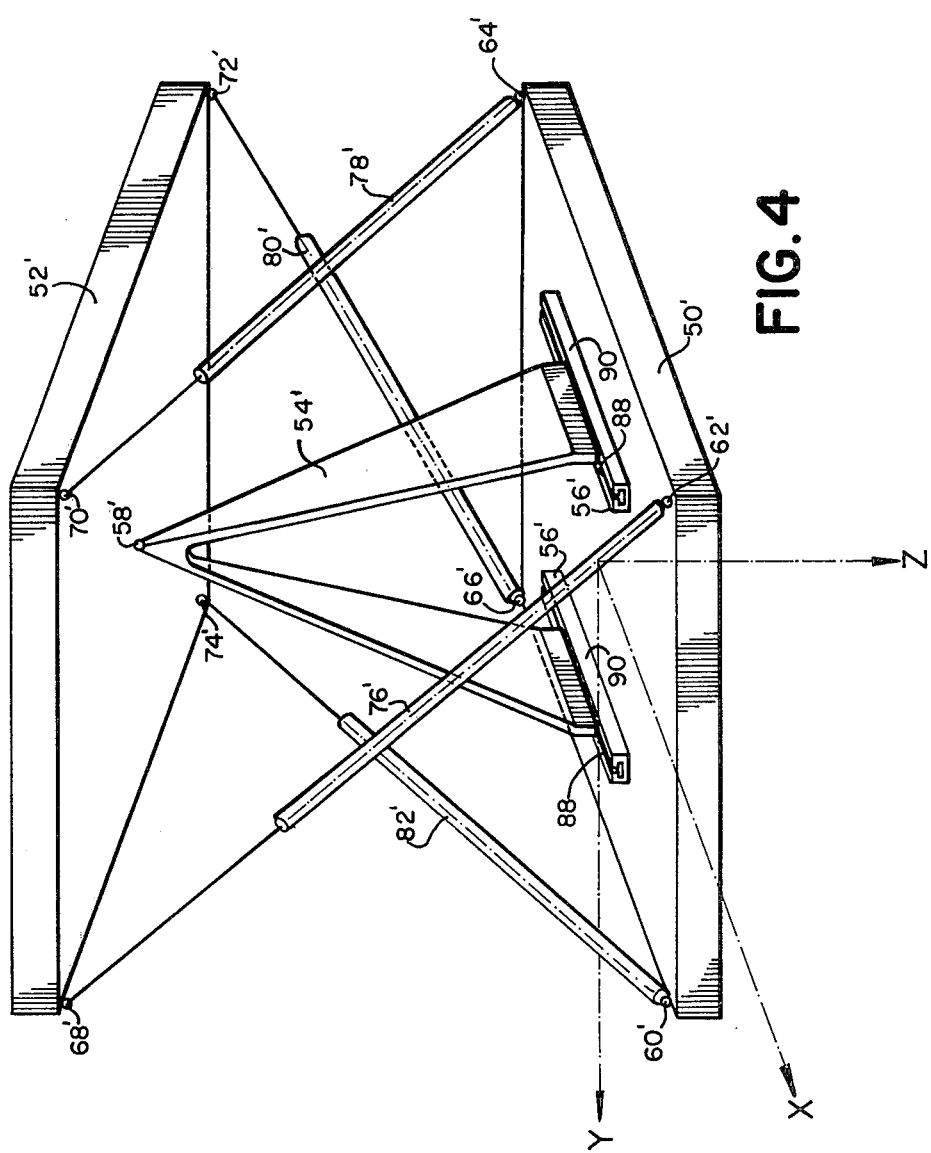

MOTION SYSTEMS PROVIDING THREE OR FOUR DEGREES OF FREEDOM

The invention described herein was made in the performance of work under NASA Contract No. NAS2-9884 and is subject to the provisions of section 305 of the National Aeronautics and Space Act of 1958 (72 Stat. 435; 42 U.S.C. 2457).

The present invention relates to a device for the generation of movement including velocity and acceleration effects and which finds particular application in simulators and trainers for airplanes, helicopters and other types of vehicles. In its most simple form, the present invention provides a platform on which a pilot housing or other desired structure can be mounted and which provides pitch, roll, yaw, and translation displacement, or any combination of these motions simultaneously.

In the prior art, there have been various types of motion systems devised. One of the older and still widely used platform mounting systems is a three-gimbal system such as commonly used to stabilize gyros and the like. The three-gimbal system, of course, effectively provides different component rotational motion between successive platforms until all three degrees of rotational motion have been provided. Because of the need to support one platform on another, the system in inherently subject to excessive "dead" mass which can dynamically compromise its performance, particularly for high speed response applications.

Another known prior-art system which, like the present invention finds its principal use in flight simulator motion systems is the "Motion Simulator" K. L. Cappel, originally patented in U.S. Pat. No. 3,295,224 dated Jan. 3, 1967, and subsequently reissued as U.S. Pat. No. Re. 27,051 on Feb. 9, 1971. The Cappel system is a six degree of freedom device and has been highly successful and widely used commercially. However, inherently it is an expensive system, particularly since it involves the use of six powered and controlled extensible members to achieve its motion and support its weight in different positions. In order to achieve different combinations of motion, the extension members must be built quite large and have a very wide range of extension, which further adds substantially to the cost.

In many applications, motion requirements can be limited to a device which provides roll, pitch and yaw, with perhaps a single translational motion. The present invention combines a high degree of maneuverability while limiting the number of powered and controlled extendable members to connect the platform to a support base and supply the required movement. In a three degree of freedom configuration, a fixed-length centerpost and only three such members are required and the range of their extension of the members may be relatively limited, yet a wide range of effects confined to the three degrees of freedom roll, pitch and yaw and combinations thereof may be achieved. The centerpost is rigidly fixed to the base and can be relatively simple and inexpensive in design and yet serves to support a large part of the platform weight, thus allowing the powered and controlled extensible members to be lighter in weight.

In the four degree of freedom configurations which may be used if limited translation movement is also required, a fourth powered and controlled extensible member is added and the fixed centerpost of the three degree of freedom arrangement is modified to a rigid, fixed length column or spacer which is pivotally supported on the base to permit rotational movement around an axis in the horizontal plane of the base, or close spaced to it. By this feature limited translational motion is achieved in a horizontal direction perpendicular to the axis of the hinges supporting the moveable column on the base accompanied by a small change in the vertical distance between platform and base. This construction may require at least some of the actuators to be slightly longer than in the three degree of freedom, but the extensible members may be smaller and lighter and fewer than in the device of the Cappel patent and, therefore, much less expensive.

More specifically, the present invention relates to a motion system capable of motion in at least three rotational degrees of freedom including various combinations thereof. A support base provides at least three points in a plane. A rigid support column is affixed to the base within the three points. The platform experiencing motion provides at least three points in a plane surrounding a universal joint for attachment of the column supported from the base, which joint permits the platform freedom of rotational movement in all directions. At least three powered and controlled extensible members are provided, each connected at one end to a point on the support base and at the other end to a point on the platform, the points of connection permitting essentially universal rotational movement so as to facilitate movement of the platform relative to its point of support at the column in response to selective changes of length of said extensible members. An actuating system is provided for actuating the selective changes in the length of extensible members producing selected motion and acceleration effects.

In a motion system providing three degrees of freedom, the column is fixed to the base and maintains a fixed position restricting any translational motion. It is typically conical in shape and supports a universal bearing at its top or apex. Only three extensible control members need to be used and, if given sufficient range within relatively narrow limits, these can produce roll, pitch and yaw, or combinations thereof with relatively wide ranges comparable to the Cappel device.

The four degree of freedom alternative requires that the column be hinged at the support base so that the platform is capable of a limited amount of horizontal movement relative to the base including a small component of vertical movement generally perpendicular to the axis of the hinge. The universal joint of attachment to the hinged column is preferably provided again at an apex, in this case of a triangular instead of a conical column. Four extensible members are used to provide stability in all positions.

For a better understanding of the present invention, reference is made to the accompanying drawings in which:

FIG. 4 is a schematic view of a modified motion system similar to that of FIG. 2.

Figure 1:
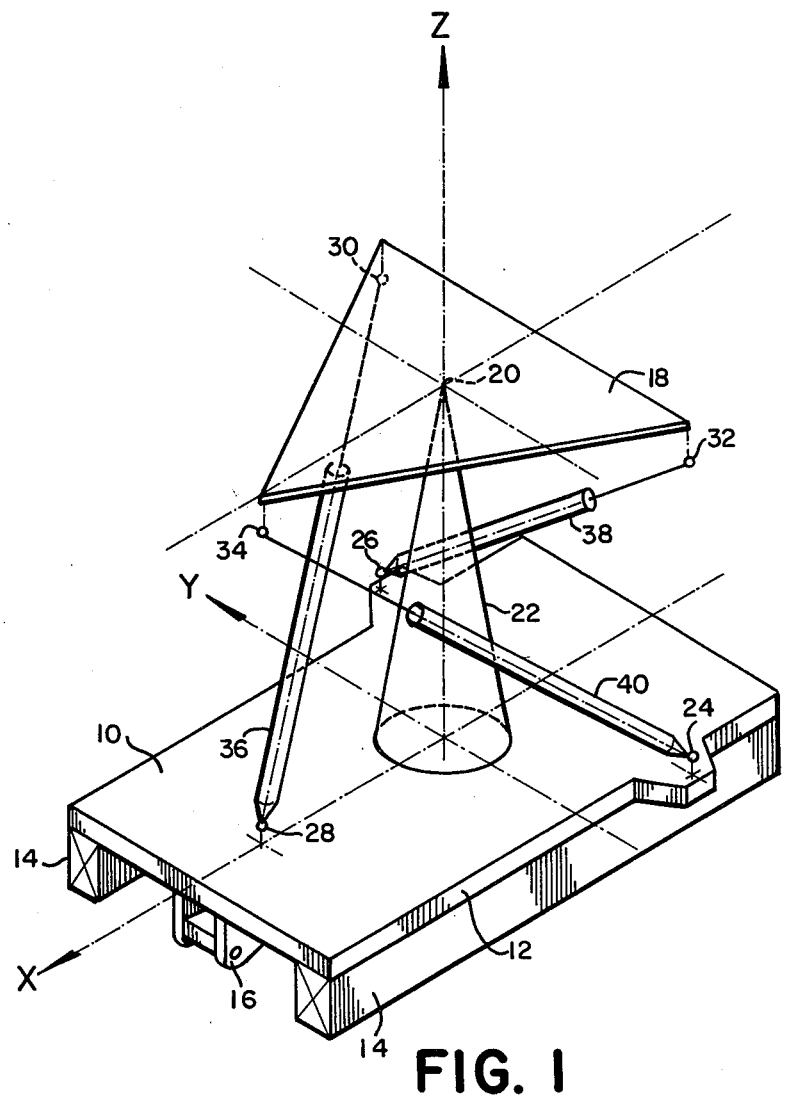
FIG. 1 is a somewhat schematic perspective showing of a motion system which permits rotational movement of all types in three degrees of freedom.

Referring first to FIG. 1, a support base 10 to support the rest of the structure must either be sufficiently heavy and rigid itself or provide means for connection to the ground. Here the support base is shown consisting of a heavy planar deck 12 supported above skid beams 14.

The platform 18 experiences the motion being simulated and supports a cab or other flight simulator superstructure, or other apparatus subject to motion and acceleration effects. Here platform 18 is a triangular metal plate, or other suitable generally-rigid member structure. At a point 20 approximately in the center of the triangle, means of connection permitting universal rotary motion about the point 20 is provided at the top of a rigid conical column 22 whose base is rigidly fixed to the support base 10 at deck 12 so as to hold the connection point about which rotational movement of the platform 18 occurs fixed in space, at least relative to the base 10. The base of the column 22 in this case is circular since the column is of right circular conical form and is provided with its axis generally perpendicular to the deck 12.

Points of attachment 24, 26 and 28 are located on or near the support deck surrounding the center column 22. Points of attachment 30, 32 and 34 are provided on or slightly below the platform 18 distributed around rigid column support point 20 and conveniently near the apexes of the triangular platform. It will be understood that the points 24, 26 and 28 may not be exactly in a base plane defined by the top surface of base plate 12 but, for example, may be raised above that by the coupling hardware. Similarly, the points of connection 30, 32 and 34 may not be directly on the platform but most usually will be beneath it spaced from it by coupling hardware, preferably at equal distances from the platform so as to define a plane parallel to the platform. Three powered and controlled extensible members 36, 38 and 40 are connected between points on the deck and on the platform. In this case, the extensible member 36 is connected between points 28 and 30, extensible member 38 between points 26 and 32, and extensible member 40 between points 24 and 34.

It will be observed that the connections are intended to be universal joints or some combination of mechanical joints which will permit essentially universal movement which will accommodate positioning to any of the positions permitted by the geometry of the device including the entire range of possible extension and contact positions of the extensible members. The extensible members 36, 38 and 40 may be of types similar to and their connections may be of types similar to those shown for corresponding devices in U.S. Pat. No. Re. 27,051 to K. L. Cappel for Motion Simulator and assigned to The Franklin Institute. The actuators may also be powered from a power system similar to the one shown in FIG. 16 of that patent and described in the specification thereof. As described, it will be understood that in the present state of the art, many means are known for accomplishing the end and any suitable means may be employed. The actual motion of the system, of course, is best computer-controlled in accordance with routines worked out by a system analyst.

Figure 2:
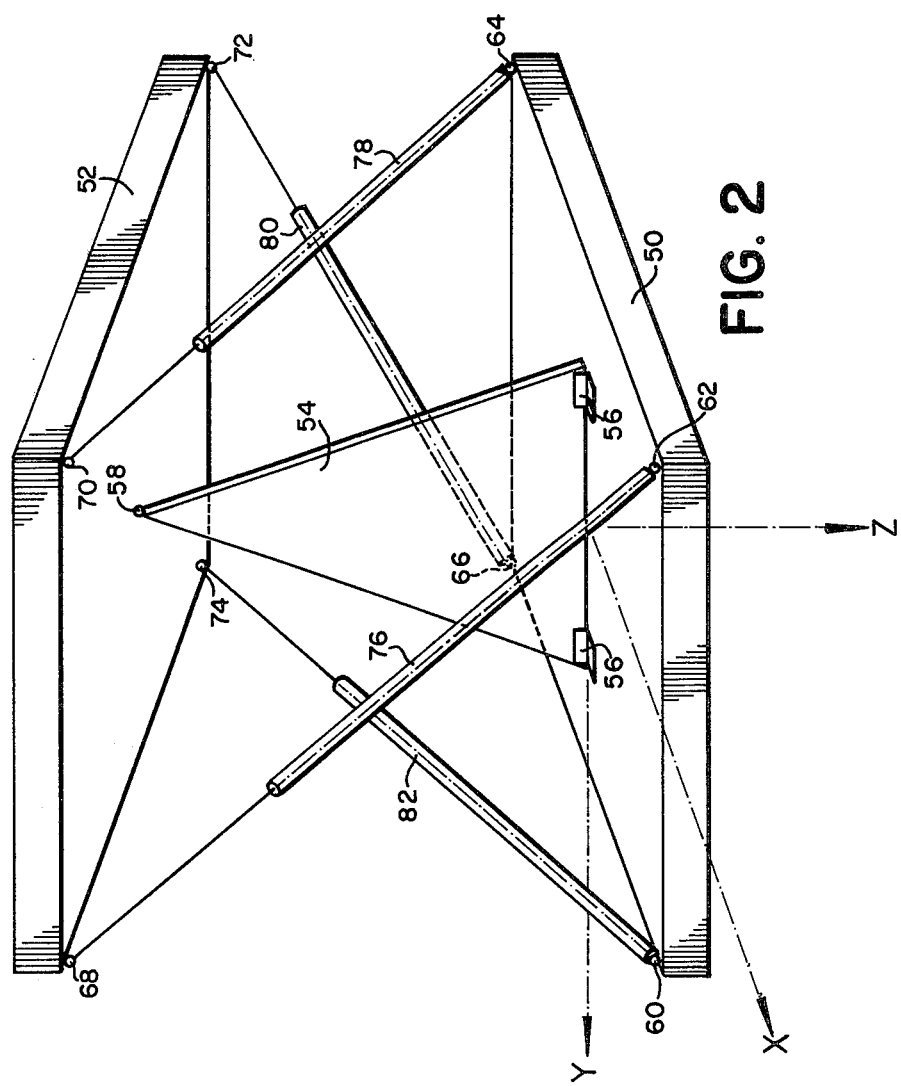
FIG. 2 is a similar schematic perspective drawing of a motion system capable of four degrees of freedom, including certain limited translational motions as well as universal rotational movement of various types.

Referring now to FIG. 2, an alternative arrangement which permits some translational movement is shown. This device is sometimes known as a four degree of freedom device and is intended to permit all three degress of rotary freedom, i.e., roll, pitch and yaw, or any combination thereof, as well as translational displacement accommodated by movement about the hinged column to be described.

In the embodiment of FIG. 2, the support base 50 is shown as a solid member which might be portable or part of a poured concrete foundation. Generally parallel to the support base 50 is the motion system platform 52 which, in turn, supports a cab or other structure subject to the motion. Between the base 50 and the platform 52 is a hinged triangular column 54. This column is attached to the base 50 along one edge of the triangle by suitable hinges 56 which permit limited rotational movement of the column 54 relative to the base 50 about the axis defined by the hinges 56. Triangular column 54 preferably is a support structure having a relatively small thickness compared to its overall dimensions sufficient to provide support for the platform 52. The hinge axis is in or very close to the surface of the base 50. In addition to having movement about the pins of hinges 56 as an axis, the triangular column 54 also provides a joint 58 with the platform 52 which permits universal movement about the joint. This joint must also support the weight of the platform and is preferably centrally-located in the platform 52 within or slightly below the bottom surface of the platform. Spaced around the base are universal joint support brackets which permit rotation movement about points 60, 62, 64 and 66 in or near the base. These points are preferably arranged in a square pattern which contains the hinged base of the triangular column 54. Similarly, suitable brackets provide four points 68, 70, 72 and 74 in or slightly below the surface of the platform 52 for connection to the extensible member. The points also are preferably arranged in a generally-square pattern with the apex universal connection point 58 at its center. The platform may be advantageously made square with the connection points adjacent its four corners. Connected between points 62 and 68 is a powered and controlled extensible member 76. Between points 64 and 70 is a similar powered and extensible member 78. Between points 66 and 72 is a similar powered and extensible member 80. Between points 60 and 74 is a similar powered and extensible member 82. The connections to the base and the platform may be outside the surface of the respective areas but preferably are arranged in the planes parallel to them. Connection is made by means such as those shown in the Cappel U.S. Pat. No. Re. 27,051 and by means permitting universal movement.

In this construction, in addition to permitting rotational movement about the pivot point 58, the pivot point itself is moved in a translational way causing a lateral shift perpendicular to the hinged axis of rotation of hinges 56 and lowering or raising the platform a small distance. As in the previous construction, the actuators 76, 78, 80 and 82 have limited range which can be much reduced over the range normally required for a six degree of freedom type simular such as that particularly shown in Cappel U.S. Pat. No. Re. 27,951. Additionally, stops can be provided to further limit the movement of the platform relative to the base or relative to any of the actuators or supports.

Again, the actuators may be of the type shown in the Cappel U.S. Pat. No. Re. 27,051 and may be driven by a similar hydraulic pneumatic or electromechanical system as described therein.

Figure 3:
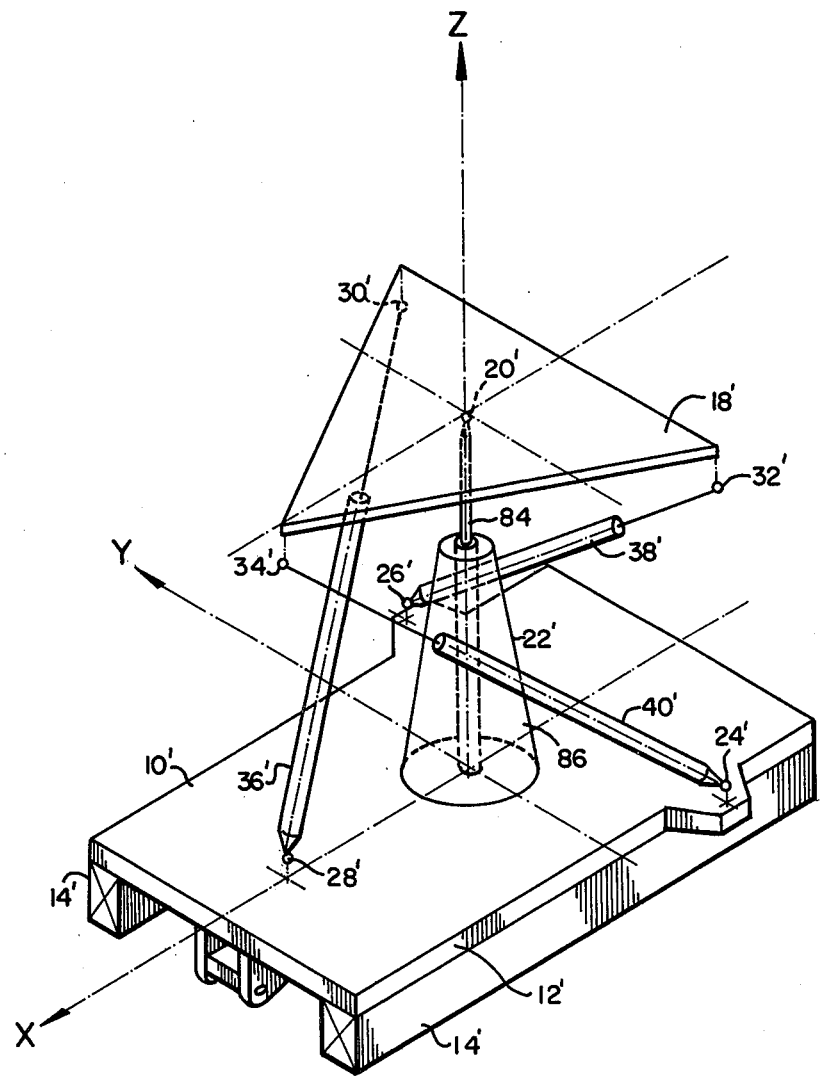
FIG. 3 is a schematic view of a modified motion system similar to that of FIG. 1.

Referring now to FIG. 3, there is shown a further modified motion system generally of the arrangement of FIG. 1, but providing a center column which itself is a powered and controlled extensible member. In other respects the arrangement is structurally very much the same as that of FIG. 1, but, because four powered and controlled extensible numbers are provided, four degrees of freedom are also available. Since the numbers correspond so closely to those of FIG. 1, corresponding number designators are used to designate similar parts which act in the same or very closely similar manners to the way in which the corresponding parts behave in the structure of FIG. 1. The principal difference is that the center column designated 22' and having a connection point 20' permitting universal rotary motion about the point 20' is provided at the top of the column. The difference, however, is that the point or universal joint 20' is now at the end of an extensible member 84, the fixed portion of which may be embedded in the frustoconical support 86 rigidly fixed to the base 10'. Thus, it will be clear that when the powered and extensible member 84 causes a change of its length, there inevitably is a change in the height, or vertical distance between the base 10' and the platform 18', involving a pure vertical movement. This vertical movement, of course, must be accommodated by the other extendible members 36', 38' and 40'. Addition of the vertical movement, however, permits this motion system to simulate not only roll, pitch and yaw, but heave, and in some applications this may be extremely important.

Referring now to FIG. 4, a system very similar to that of FIG. 2 and having many similar parts is illustrated. Since the parts are so similar, they are given similar number designators which, however, are distinguished by the addition of primes to the numbers in FIG. 4. The difference in FIG. 4, however, is that the triangular hinged support column 54 has been replaced, in this case by an inverted V-shaped column 54' which maintains and allows no change in the fixed vertical spacing between the parallel platform 52' and the base 50'. In this case, the column 54' is a rigid column which, instead of a hinged connection, has a connection with the base 50' through tracks or guideways 88 which are similar, parallel to one another, and spaced far enough apart to provide stability. These tracks snuggly accept blade means 90 at the bottom of the separate legs of the inverted V-shaped column 54'. The blades 90 are accommodated in the tracks 88 which provide linear bearings to permit linear horizontal movement in either direction along a straight line. No additional drive is required. Such a structure provides a pure horizontally directed motion. Thus, in this four degree of motion system, there are the three rotational degrees of freedom, roll, pitch and yaw about pivot point 58' and there is a horizontal linear motion which effectively moves pivot point 58' relative to the base.

Various embodiments of the present invention have been described. Additional embodiment will occur to those skilled in the art. All such variations and modifications within the scope of the claims are intended to be within the scope and spirit of the present invention.

I claim:

1. A motion system capable of motion in three degrees of freedom, specifically roll, yaw and pitch, or any combination thereof, comprising:
   a platform providing four points of connection at least three of which lie generally in a plane;
   a support base providing three points of connection in another plane;
   a support column extending from a generally center position in the base to a connection point in the platform and having coupling means permitting rotational movement of any type about that point;
   three and only three powered and controlled extensible members, one each being connected between a different one of the remaining three connection points on the platform and a different one of the three connection points on the support base by joints permitting any relative movement between the extensible members but so that the extensible members within the limits of their movement must remain at acute angles to the platform so that the structure is a statically determined system; and
   a control system for actuating the selective changes in the length of extensible members producing a motion.

2. A motion system capable of motion in three rotational degrees of freedom including various combinations thereof comprising:
   a support base having three points of connection in a plane;
   a support column connected to the base within the three points;
   a platform attached to the column supported from the base, which attachment permits the platform freedom of rotational movement in all directions, said platform providing three points of connection in a plane surrounding the attachment to the support column;
   three, and only three, extensible members each connected at one end to a different one of the three connection points on the support base and at the other end to a different one of three connection points on the platform, the points of connection permitting essentially universal rotational movement so as to facilitate movement of the platform relative to its point of attachment to the column in response to selective changes of length of said extensible members, the extensible members being selected so that, in the course of their movements, the extensible members remain at acute angles to the platform and so that the structure is a statically determined system.

3. The motion system of claim 2 in which the powered and controlled extensible members are powered and controlled by a control system for selectively making changes in the lengths of the extensible members one at a time or in a predetermined coordinated manner.

4. The motion system of claim 3 in which the support column is a column rigidly affixed to the base so that the point of attachment to the platform permits universal rotational movement only relative to that fixed point on the platform.

5. The motion system of claim 4 in which the column is conical with the apex of the cone providing the point of attachment to the platform and extending downwardly therefrom to the base.

6. The motion system of claim 4 in which the support column is a rigid member of limited thickness.

7. A motion system capable of motion in three rotational degrees of freedom and a fourth degree of freedom including various combinations thereof comprising:
   a support base having at least three points of connection in a plane;
   a support column connected to the base within the three points;
   a platform attached to the column supported from the base, which attachment permits the platform freedom of rotational movement in all directions, said platform providing at least three points of connection in a plane surrounding the attachment to the support column;

four, and only four, extensible members at least three connected at one end to a different one of the at least three connection points on the support base and at the other end to a different one of the at least three connection points on the platform, the points of connection permitting essentially universal rotational movement so as to facilitate movement of the platform relative to its point of attachment to the column in response to selective changes of length of said extensible members, the extensible members being selected so that, in the course of their movement, at least three of the extensible members remain at acute angles to the platform and so that the structure is a statically determined system.

8. The motion system of claim 7 in which the extensible members are powered and controlled by a control system for selectively makeing changes in the lengths of the extensible members one at a time or in a predetermined coordinated manner.

9. The motion system of claim 8 in which the column is provided with means guided by spaced parallel track means on the base to allow horizontal linear movement of the column and the fourth extensible member is connected between a fourth point of connection on the base and a fourth point of connection on the platform.

10. The motion system of claim 8 in which the column is the fourth extensible member, the column having limited extensible movement.

11. The motion system of claim 10 in which the extensible movement permitted by the column is limited to vertical movement.

12. The motion system of claim 11 in which the column is a powered and extensible member permitting vertical height adjustment of the platform but is held in fixed vertical orientation relative to the base.

13. The motion system of claim 8 in which the column is attached to the base by attachment means which permits rotation relative to the base about an axis fixed relative to the base and the fourth extensible member is connected between a fourth point of connection on the base and a fourth point of connection on the platform.

14. The motion system of claim 13 in which the axis of rotation is parallel to and closely spaced from the base, permitting a hinged movement about the axis and therefore permitting a translational horizontal movement perpendicular to the axis and a small vertical movement as between the platform and the base.

15. The motion system of claim 14 in which the support column is of generally triangular shape having one edge of the triangle rotatably attached to the base and the opposed angle apex as its point of universal attachment to the platform.

* * * * *